United States Patent [19]

Conrad

[11] Patent Number: 5,071,150
[45] Date of Patent: Dec. 10, 1991

[54] TRICYCLE APPARATUS

[76] Inventor: Richard L. Conrad, 1222 Gardendale, Owensboro, Ky. 42301

[21] Appl. No.: 612,547

[22] Filed: Nov. 13, 1990

[51] Int. Cl.⁵ .............................................. B62K 5/02
[52] U.S. Cl. .................................. 280/264; 280/282; 280/288.4; 280/293
[58] Field of Search ............ 280/239, 264, 263, 281.1, 280/282, 288.4, 293, 304.3, 1.184, 763.1, 769, 758, 759, 211

[56] References Cited

U.S. PATENT DOCUMENTS

| | | |
|---|---|---|
| 3,096,100 | 6/1963 | Clarke et al. ...................... 280/1.184 |
| 3,961,810 | 6/1976 | Arico ................................. 280/304.3 |
| 4,281,844 | 8/1981 | Jackman et al. .................... 280/263 |
| 4,484,646 | 11/1984 | Smith ................................. 280/211 |
| 4,522,420 | 6/1985 | Hannappel ......................... 280/295 |
| 4,826,190 | 5/1989 | Hartmann ........................... 280/264 |

FOREIGN PATENT DOCUMENTS 8908043 9/1989 World Int. Prop. O. .......... 280/239

Primary Examiner—Charles A. Marmor
Assistant Examiner—Victor E. Johnson
Attorney, Agent, or Firm—Leon Gilden

[57] ABSTRACT

An apparatus wherein a tricycle arrangement mounts its associated seat overlying a rear axle, wherein the rear axle mounts a plurality of spaced wheels, with a forward wheel medially positioned relative to the rear wheels. A sprocket and chain drive directs rotative energy to rotatably drive the rear wheels. A rear stabilizer wheel is positioned rearwardly of the rear wheels. The stabilizer wheel is normally spaced above a ground support surface in a first position and is in contact with the ground support surface in a second position when the forward wheel is spaced above the ground and pivoted about the rear drive wheels. A counter-weight structure is optionally utilized to enhance such pivotment.

2 Claims, 4 Drawing Sheets

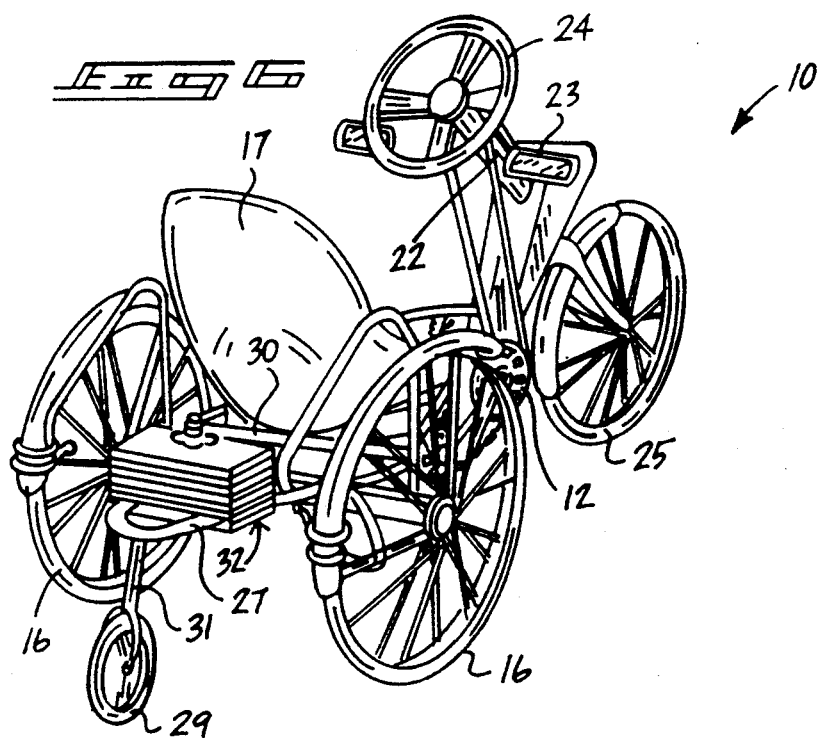
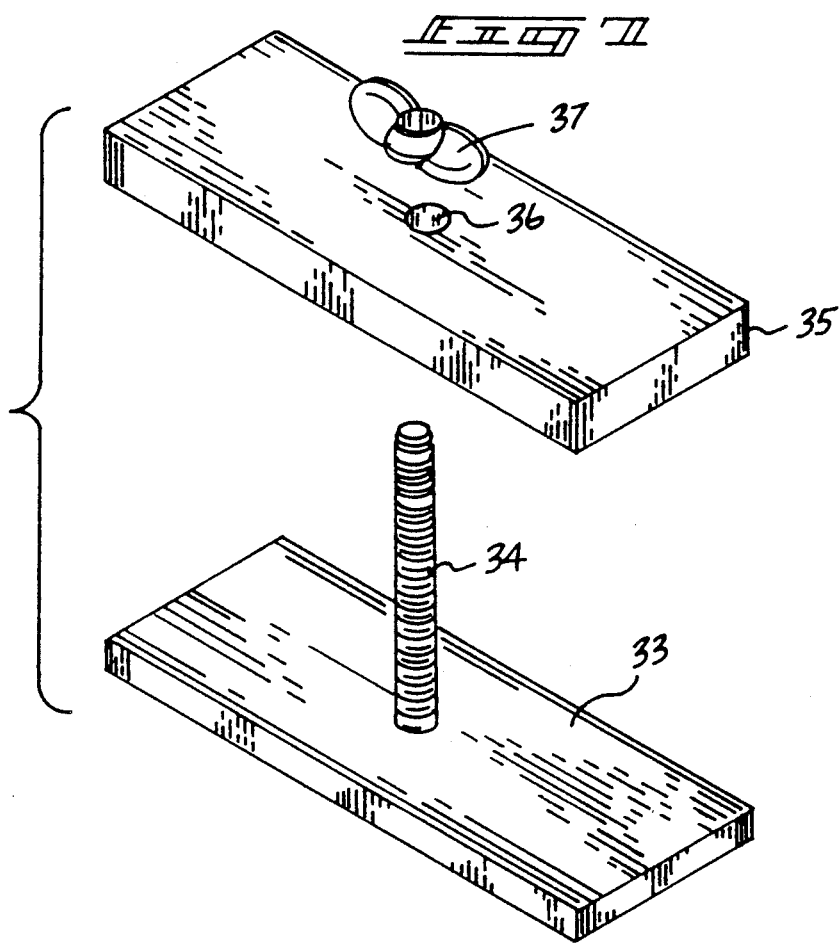

TRICYCLE APPARATUS

BACKGROUND OF THE INVENTION

1. Field of the Invention

The field of invention relates to tricycle apparatus, and more particularly pertains to a new and improved tricycle apparatus wherein the same may be steered with a forward wheel in a raised position relative to a ground support surface.

2. Description of the Prior Art

Various tricycle apparatus of various configurations have been utilized in the prior art. The instant invention sets forth an organization wherein the same permits steerage of the tricycle apparatus with a single forward wheel in an elevated position relative to a ground support surface by application of a right or left brake selectively to a respective right and left wheel. A rear stabilizer wheel stabilizes the organization when the forward wheel is in a raised orientation. Examples of the prior art include U.S. Pat. No. 4,423,795 to Winchell, et al. wherein a tricycle arrangement utilizes a front wheel selective of cambering upon tilting an individual's weight during a steering procedure.

U.S. Pat. No. 4,826,190 to Hartmann sets forth a tricycle apparatus with a fully enclosed, multiple speed drive.

U.S. Pat. No. 4,792,149 to Harmon sets forth a golf cart arrangement utilizing pedal power to effect motivation of the cart.

U.S. Pat. No. 2,201,440 to Letourneau, et al. provides for a vehicular toy arranged for motivation with a single rear wheel and a plurality of forward wheels.

U.S. Pat. No. 4,410,198 to Fernandes sets forth a human powered vehicle arranged for an individual to lie in a supine position within a stream-lined shell.

As such, it may be appreciated that there continues to be a need for a new and improved tricycle apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of tricycle apparatus now present in the prior art, the present invention provides a tricycle apparatus wherein the same effects usage of braking apparatus and a stabilizing wheel positioned rearwardly of the rearwardly spaced tricycle wheels to effect steerage and stability to the organization in use. As such, the general purpose of the present invention, which will be described subsequently in greater detail, is to provide a new and improved tricycle apparatus which has all the advantages of the prior art tricycle apparatus and none of the disadvantages.

To attain this, the present invention provides an apparatus wherein a tricycle arrangement mounts its associated seat overlying a rear axle, wherein the rear axle mounts a plurality of spaced wheels, with a forward wheel medially positioned relative to the rear wheels. A sprocket and chain drive directs rotative energy to rotatably drive the rear wheels. A rear stabilizer wheel is positioned rearwardly of the rear wheels. The stabilizer wheel is normally spaced above a ground support surface in a first postion and is in contact with the ground support surface in a second position when the forward wheel is spaced above the ground and pivoted about the rear drive wheels. A counter-weight structure is optionally utilized to enhance such pivotment.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Still yet another object of the present invention is to provide a new and improved tricycle apparatus which provides in the apparatuses and methods of the prior art some of the advantages thereof, while simultaneously overcoming some of the disadvantages normally associated therewith.

Still another object of the present invention is to provide a new and improved tricycle apparatus wherein the same utilizes individual braking of each individual rear wheel to effect steerage of the organization in an orientation with the forward wheel lifted relative to a ground support surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a rear isometric illustration of the instant invention utilizing a rear stabilizing wheel and counter-weight organization.

FIG. 7 is an isometric illustration setting forth details of the counter-weight organization.

DESCRIPTION OF THE PREFERRED EMBODIMENT

Figure 1:
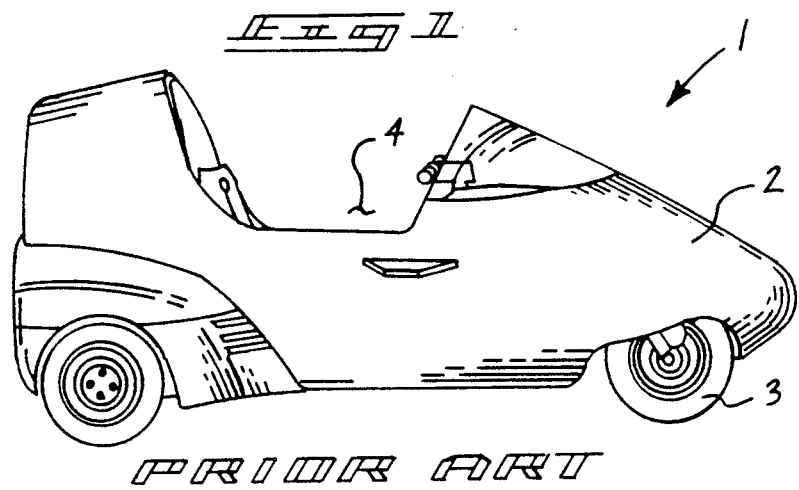
FIG. 1 is an orthographic side view, taken in elevation, of a prior art tricycle apparatus.

With reference now to the drawings, and in particular to FIGS. 1 to 7 thereof, a new and improved tricycle apparatus embodying the principles and concepts of the present invention and generally designated by the reference numeral 10 will be described.

Figure 2:
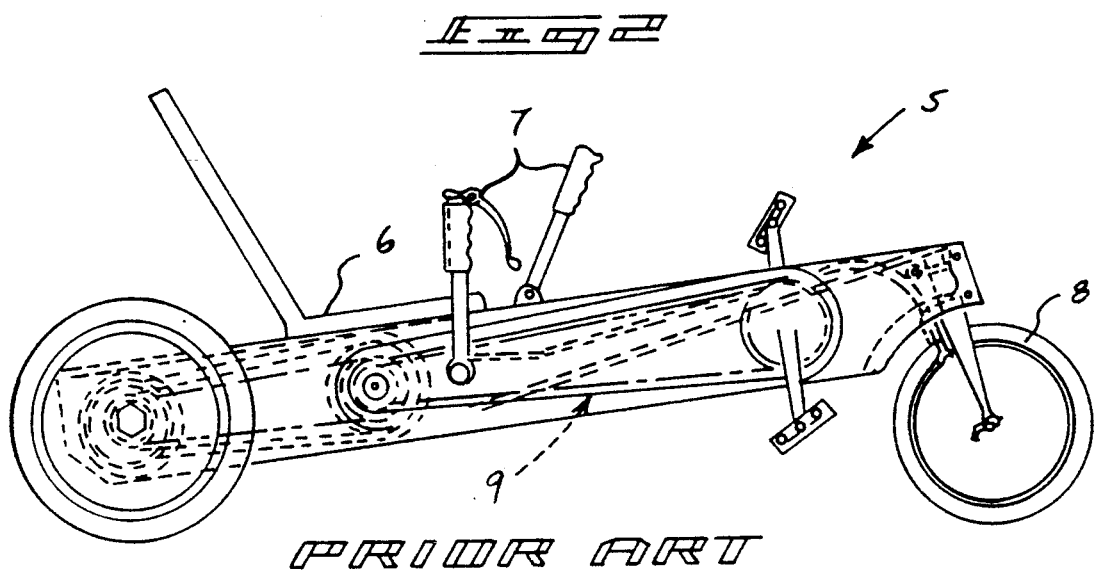
FIG. 2 is an orthographic side view, taken in elevation, of a further prior art tricycle apparatus.
Figure 3:
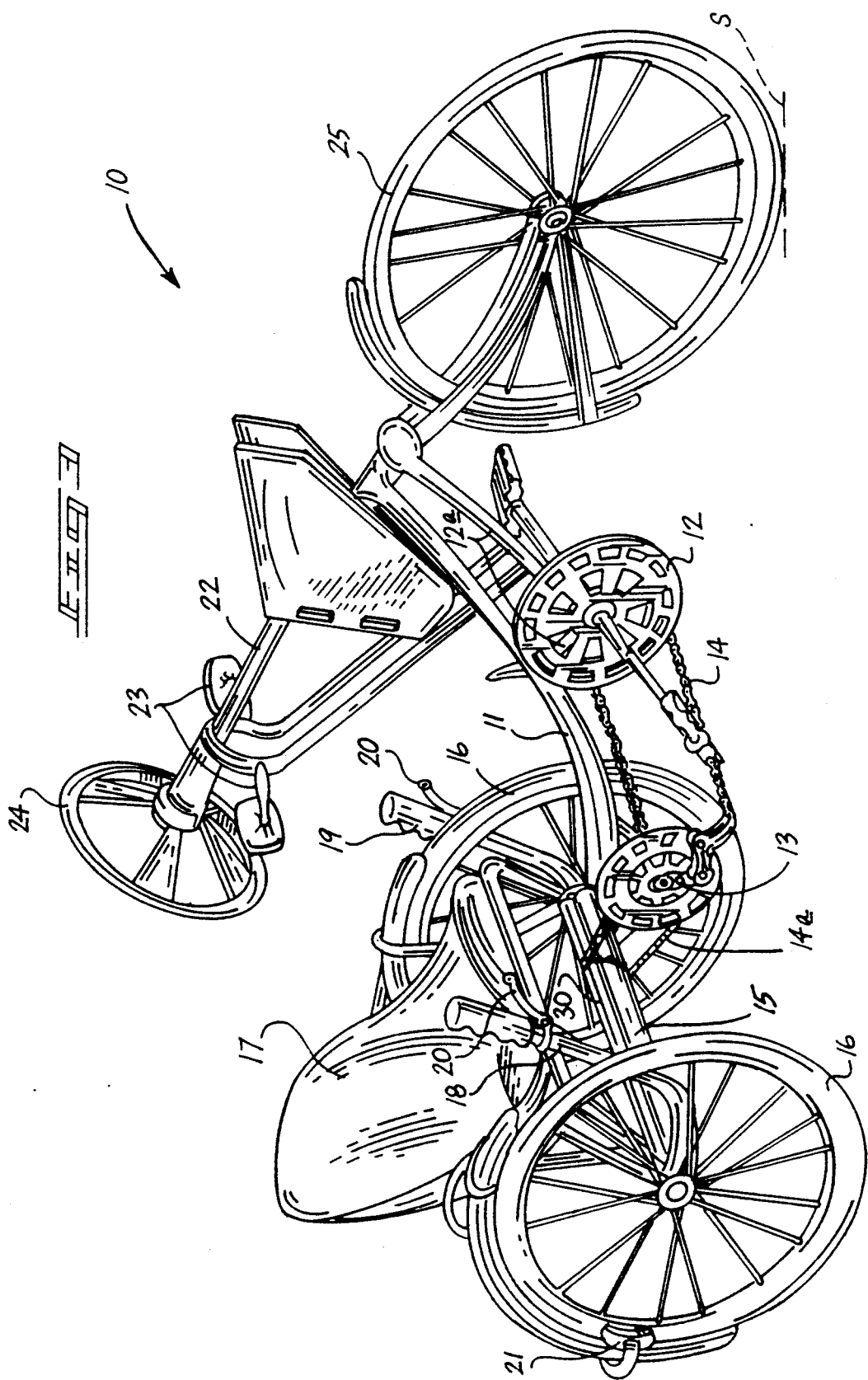
FIG. 3 is an isometric illustration of the instant invention.

FIG. 1 illustrates a prior art tricycle apparatus 1, wherein an enclosed body member 2 includes a single forward wheel 3, with a cockpit 4 arranged between the forward and rear wheel, in a manner as set forth in U.S. Pat. No. 4,423,795. FIG. 2 illustrates a further prior art tricycle apparatus 5 utilizing a seat 6 positioned between the forward and rear wheels, with steering lever 7 arranged for rotation of the forward wheel 8 for steerage and utilizing a completely enclosed sprocket drive arrangement 9, as set forth in U.S. Pat. No. 4,826,190 and incorporated herein by reference. Each brake lever operates selectively a brake caliper 21 mounted relative to each wheel 16 of the right and left wheels to permit an individual to selectively effect braking of the right or left wheel of the rear wheel 16 in a selective manner. This selective braking permits steerage of the organization when the front wheel 25 is in a raised orientation relative to a ground support surface that the tricycle 10 is traversing. A steering tube 22 is mounted to a forward terminal end of the frame tube 11 and includes a plurality of rear view mirrors 23 mounted laterally therefrom, as well as a steering wheel 24 to permit rotation of the front wheel 25. The front wheel 25 is positioned forwardly and medially of the rear wheel 16. Accordingly, an individual may thusly effect steerage by the front wheel 25 through the steering wheel 24 when the front wheel 25 is on a ground support surface "S", but the organization may be further steered by utilizing either brake lever 20 in cooperation with each caliper 21 of a respective right and left rear wheel of the rear wheel 16 when the front wheel 25 is in a raised elevation positioned relative to the ground support surface "S", as illustrated in FIG. 5 for example.

Figure 4:
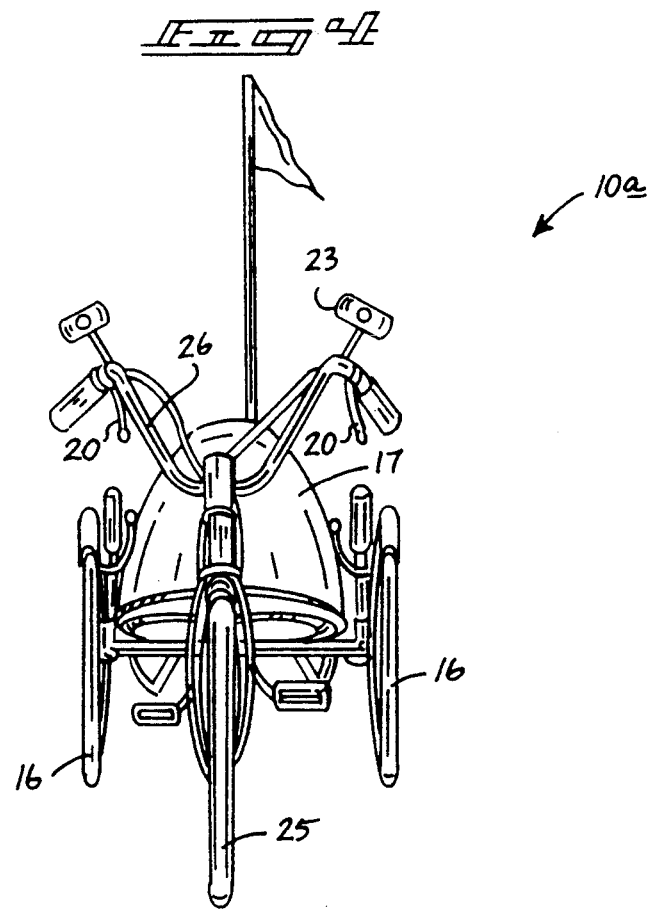
FIG. 4 is an orthographic frontal view, taken in elevation, of a modification of the instant invention.
Figure 5:
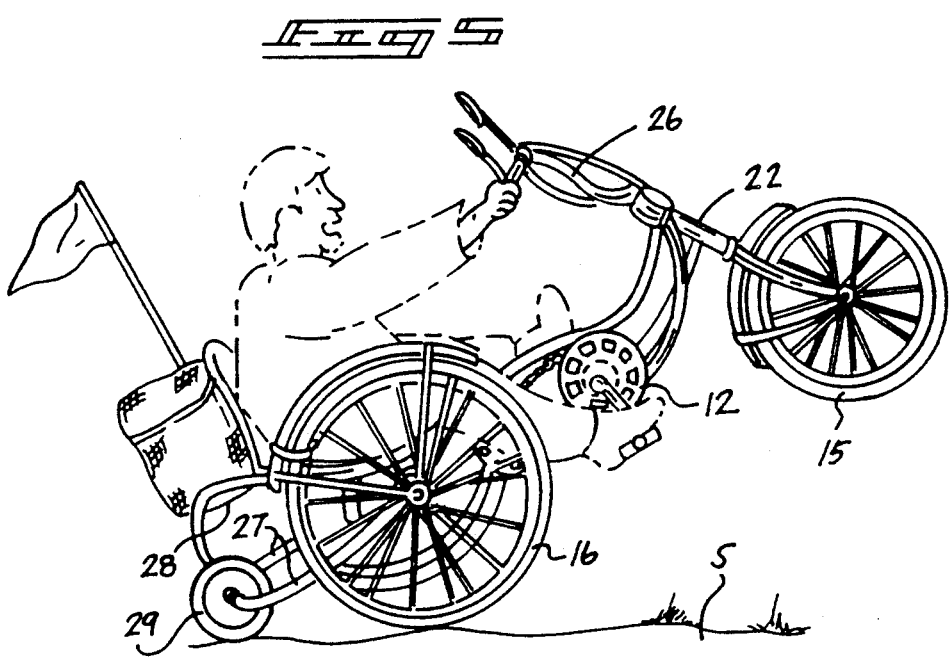
FIG. 5 is an orthographic side view of the apparatus as set forth in FIG. 4.

FIGS. 4 and 5 set forth the utilization of a "U" shaped handle bar steering assembly 26 mounted to an upper terminal end of the steering tube 22, with a brake lever 20 to each right and left side of the handle bar steering assembly 26. A "U" shaped central tube frame 27 is directed rearwardly of the seat support tube 30 and rotatably mounts a stabilizing wheel 29 thereon to effect stability to the organization when in a second elevated position, as illustrated in FIG. 5. In the organization as set forth in FIGS. 4 and 5, the use of a transport container is mounted to a rear surface of the seat member 17.

FIGS. 6 and 7 illustrate the use of the organization in utilizing an essential "U" shaped rear extension 27 mounted to the seat support tube 30. The "U" shaped rear extension 27 includes a vertical wheel support tube 31 mounting the stabilizing wheel 29 at a lower terminal end thereof. It should be noted that the stabilizing wheel 29 is in an elevated position relative to a ground support surface in a first position when the front wheel 25 is in contact with the ground and wherein the stabilizing wheel 29 is in contact with the ground, and wherein the stabilizing wheel is contact with the ground when the front wheel 25 is in a raised position pivoted about the rear wheels 16. An adjustable counter-weight stack 32 is provided, including a bottom plate 33 defined by a length substantially greater than the spacing between the adjacent tubes of the "U" shaped rear extension 27 to underlie the tubes of the rear extension 27, wherein a threaded mounting rod 34 is orthogonally and integrally mounted medially to the bottom plate 33 and extends upwardly therefrom the top plate 35 of a plurality of such top plates, each including a top plate aperture 36 directed medially through the top plate to clamp the rear extension 27 between the bottom plate 33 and a top plate 35. An internally threaded fastener 37 is threadedly mounted over the mounting rod 34 to effect clamping of the rear extension 27 between the plate structure, as illustrated in FIG. 6 for example, to enhance an individual's ability to effect pivotment of the organization about the rear wheels 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A tricycle apparatus for traverse of a support surface comprising,
   a central frame tube, the central tube including a forward terminal end, with a steering tube mounted at an oblique angle relative to the forward terminal
   end of the central frame tube,
   and the central frame tube including
   a rear terminal end,
   and a rear axle member mounted orthogonally to the rear terminal end of
   the frame tube,
   and a seat support tube mounted fixedly
   to and overlying the rear axle,
   and a front wheel mounted rotatably and below the steering tube, with a steering wheel mounted adjacent an upper terminal end of the steering tube to effect
   relative rotation of the front wheel,
   and a right and left rear wheel mounted to each respective right and left terminal
   end of the rear axle member,
   and a right and left handle mounted to the seat support tube and extending upwardly therefrom, with the right and left handle including a respective right and left brake lever, the right and left rear wheel including a respective right and left brake caliper, wherein the right and left brake lever selectively operate the right and left brake caliper, and including a "U" shaped rear extension tube extending fixedly to and rearwardly of the seat support tube, and the "U" shaped rear extension tube including a vertical wheel support tube mounted fixedly to and downwardly relative to the "U" shaped rear extension tube, and the vertical wheel support tube including a stabilizer wheel rotatably mounted to a lower terminal end of the wheel support tube, and the stabilizer wheel arranged in a spaced relationship relative to the support surface receiving the tricycle apparatus in a first position when the front wheel is in contact with the support surface, and the stabilizing wheel positioned in a second position in contact with the support surface when the front wheel is in a second position in a spaced relationship relative to a support surface to effect pivotment of the front wheel about the axle member, and further including a counter-weight assembly selectively secured to a top surface of the "U" shaped rear extension tube, and a bottom plate secured to a bottom surface of the "U" shaped rear extension tube to capture the "U" shaped rear extension tube between the counter-weight assembly and the bottom plate, and the bottom plate including a threaded mounting rod orthogonally and medially mounted in a fixed relationship to a top surface of the bottom plate, and the counter-weight including at least one top plate, wherein the top plate includes a top plate aperture and the top plate aperture is positioned medially of the top plate and receives the threaded mounting rod therethrough, wherein the top plate is positioned to overlie the "U" shaped rear extension tube, and an internally threaded fastener threaded securely to the threaded mounting rod overlying the top plate to secure the top plate and the bottom plate together in a clamping relationship to secure the "U" shaped rear extension tube therebetween.

2. An apparatus as set forth in claim 1 including drive means mounted to the central frame tube for effecting selective rotation of the rear axle.

* * * * *